(12) United States Patent
Calhoun

(10) Patent No.: US 6,328,013 B1
(45) Date of Patent: Dec. 11, 2001

(54) MOTOR ENGINE CONTAINMENT STRAP

(76) Inventor: Earl H. Calhoun, 220 S. Columbia St., Gastonia, NC (US) 28054

( * ) Notice: Subject to any disclaimer, the term of this patent is extended or adjusted under 35 U.S.C. 154(b) by 0 days.

(21) Appl. No.: 09/523,239

(22) Filed: Mar. 10, 2000

Related U.S. Application Data

(60) Provisional application No. 60/124,068, filed on Mar. 12, 1999.

(51) Int. Cl.$^7$ .................................................. B60R 21/00
(52) U.S. Cl. ........................................................ 123/198 D
(58) Field of Search ................................... 180/346, 271, 180/219; 123/198 R, 198 D

(56) References Cited

U.S. PATENT DOCUMENTS

| | | | |
|---|---|---|---|
| 5,001,779 | * | 3/1991 | Eggert et al. ................. 455/346 |
| 5,614,280 | * | 3/1997 | Hanna ........................... 428/74 |

* cited by examiner

*Primary Examiner*—Henry C. Yuen
*Assistant Examiner*—Hyder Ali

(74) *Attorney, Agent, or Firm*—Dougherty & Clements LLP

(57) ABSTRACT

The present invention is an apparatus and method for containing the cylinder heads and other parts of a high-performance motor engine during an uncontrolled explosion of the engine. The invented engine containment strap is a multi-ply band of heavy woven webbing having metal buckles on each end of the material. A first and a second buckle are attached to the respective adjacent ends of the strap. Each buckle has a slot defined near the edge of the buckle. Each end of the strap is inserted through the slot of its respective buckle and then folded back upon itself. The resulting four layers at each end of the strap are then stitched together, with the stitching repeated in a pattern to reinforce the stitched ends. The encircling engine strap is placed around the cylinder heads and engine block of the motor engine, with the ends of the strap having the buckles attached together by connector bolts, thus providing an engine containment strap that completely encircles the motor engine. In the event of an engine explosion, projectiles are either contained by the strap or redirected away from the head and torso of the rider.

15 Claims, 3 Drawing Sheets

MOTOR ENGINE CONTAINMENT STRAP

CROSS REFERENCE TO RELATED APPLICATION

This application claims the benefit of U.S. Provisional Application Ser. No. 60/124,068 filed Mar. 12, 1999.

FIELD OF THE INVENTION

The present invention relates to a safety apparatus for use with high-performance motor engines, and more particularly to an apparatus for restraining the projection of motor engine parts during an uncontrolled explosion of a high-performance motor engine.

BACKGROUND

In high-performance motorcycle and boat racing, engines are utilized that are structurally reinforced for the use of highly explosive fuels such as nitrous oxide, nitro-methane, alcohol, gasoline, and other fuel combinations. Despite the careful design of these racing engines, and the controlled injection of fuel mixtures, destructive, uncontrolled explosions occasionally occur during racing that destroy a motorcycle or boat engine. When a racing engine explodes, the motorcycle operator may be critically injured or killed due to the missile-like projection of parts from the engine. A motorcycle operator is particularly vulnerable because the racing position of a driver is located directly over the motorcycle engine.

When high-performance engines explode, piston heads tend to separate from the piston cylinders and engine blocks. The piston heads may then be projected out of and away from the main engine body at tremendous velocity. Due to the orientation of engines having V-twin, angled V-twin, or four to six in-line cylinder arrangements, at least one piston head may be propelled away from the engine by an uncontrolled fuel explosion toward the race drivers chest or head. Approximately two deaths a year occur in motorcycle racing due to exploding engines, with additional serious injuries incurred by race drivers who survive episodes of exploding engines.

The explosion of high-performance boat engines also claim numerous lives each year. A safety device designed to contain an uncontrolled explosive engine is desperately needed to protect race drivers.

SUMMARY OF THE INVENTION

The present invention is an apparatus for containing the cylinder heads and other parts of a high-performance motor engine during an uncontrolled explosion of the engine. The invented engine containment strap is a multi-ply band of heavy woven webbing having metal buckles on each end of the material. In use, the strap is fastened around an engine so that the strap passes under the main portion of the engine and then over the cylinder heads, which are typically found on the top of the engine.

The invented engine containment strap comprises a first layer and a second layer of material and two metal buckles. The two layers of material, approximately equal in length, rest flush against one-another. Two layers of material are used because of the improved strength gained with the use of multiple layers. A single layer of material may be used, but a single layer results in a significant reduction in strap strength. Three or more layers may be used in a strap, though the extra strength gained by the additional straps is unnecessary for all but the most powerful engines. The layers are made of heavily woven material having interwoven web construction. Preferably, the material is a high strength polymeric material such as Kevlar™.

A first and a second buckle are attached to the respective adjacent ends of the strap. Each buckle has a slot defined near the edge of the buckle. Each end of the strap is inserted through the slot of its respective buckle and then folded back upon itself The resulting four layers at each end of the strap are then stitched together, with the stitching repeated in a pattern to reinforce the stitched ends.

The buckles have two holes defined in each buckle. Connector bolts are attachable through the holes in the buckles when the buckles are overlaid, forming an encircling engine containment strap.

The encircling engine strap is placed around the cylinder heads and engine block of the motor engine, with the ends of the strap having the buckles attached together by the connector bolts, thus providing an engine containment strap that completely encircles the motor engine. During normal operation, the invented strap is installed around the engine and cylinder heads to encircle all parts that may break apart and be projected upwards towards the rider of the motorcycle. In the event of an engine explosion, projectiles are either contained by the strap or redirected away from the head and torso of the rider.

The invented containment strap provides a strong and pliable strap that can encircle different engine configurations, and can withstand a highly destructive separation of parts from a high-performance motor engine to protect the race driver from physical harm.

OBJECTS OF THE INVENTION

Accordingly, the primary purpose of the present invention is to provide a safety strap which protects an operator of a motor engine from being injured by projectiles released during a motor engine explosion.

Another of the objects of the present invention is to provide an apparatus for containment of uncontrolled explosion motor engines.

A further object of this invention is to provide a safety strap that is flexible, low cost, and can encircle high performance motor engines.

Another object of the invention is to provide a containment strap that can withstand a highly destructive separation of engine parts from high performance motor engines.

BRIEF DESCRIPTION OF THE DRAWINGS

In view of the above and other objects of the invention, which will become more readily apparent by referring to the following detailed description, the appended claims, and the appended drawings in which:

FIG. 4 is an isometric view of one end of the dual layers of the straps of the engine containment strap;

DETAILED DESCRIPTION

Figure 1:
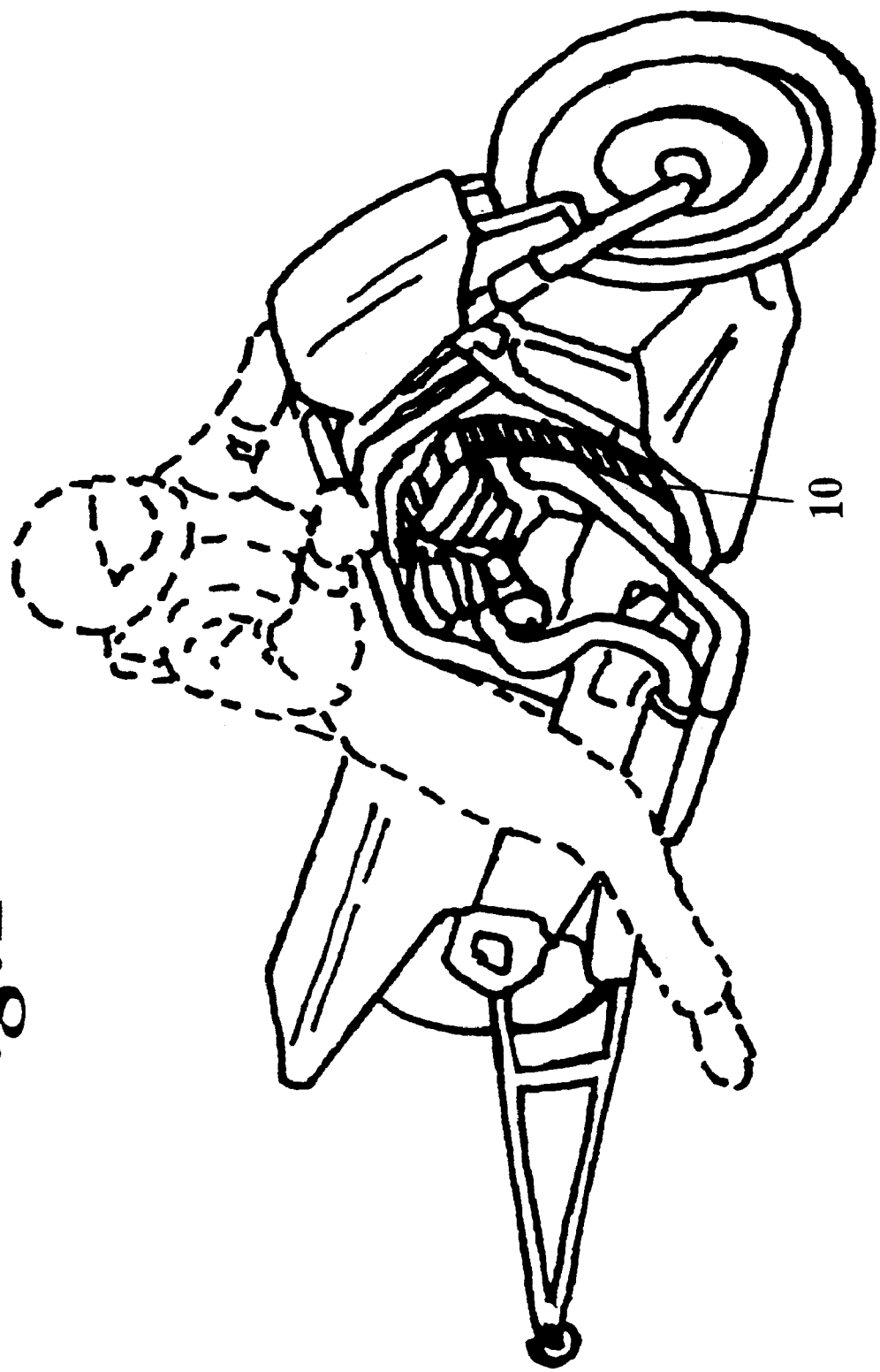
FIG. 1 is an isometric view of one embodiment of use of the engine containment strap of the current invention.
Figure 2:
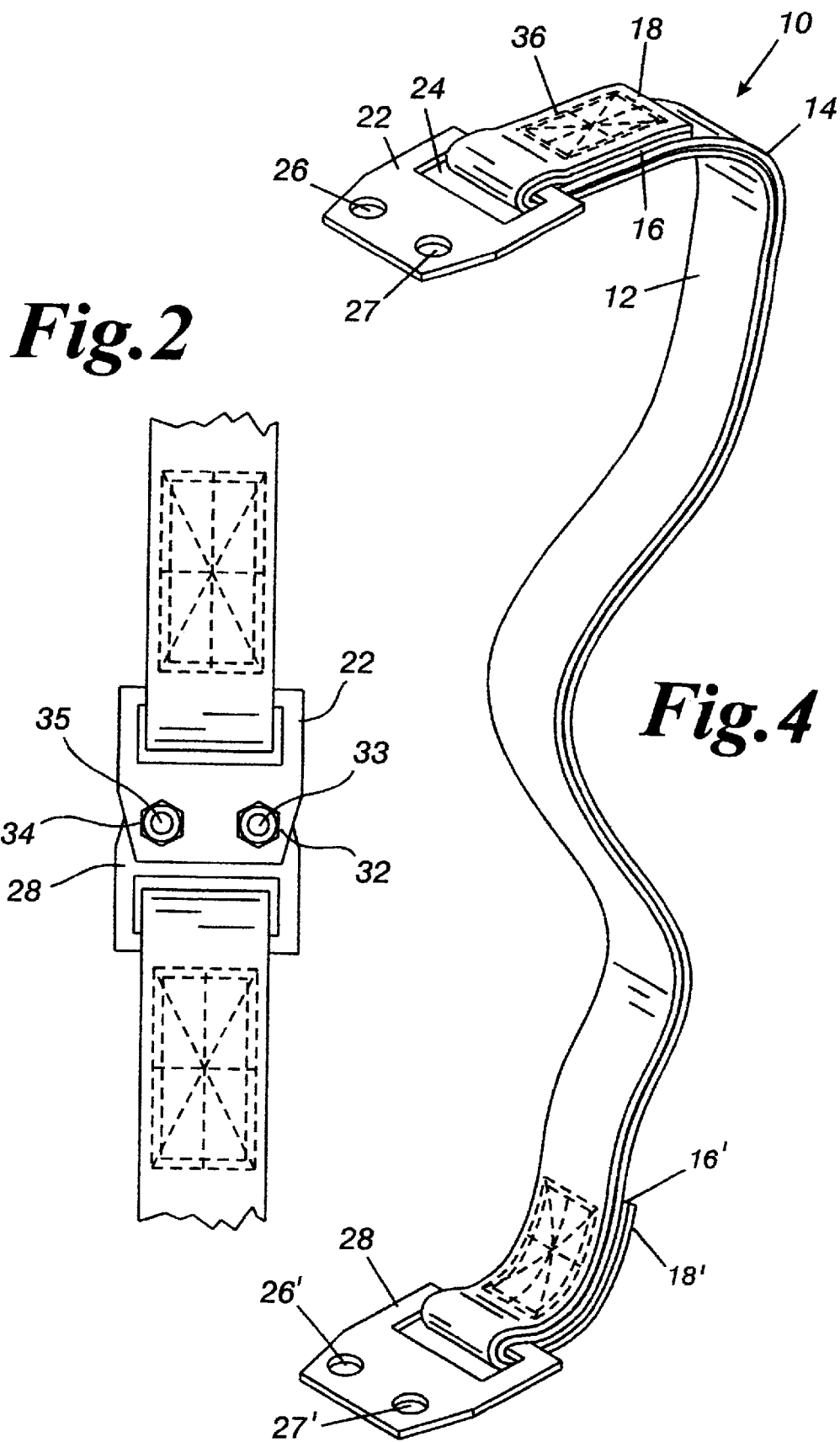
FIG. 2 is a detail view of the two bracket ends of the engine containment strap attached together.
Figure 3:
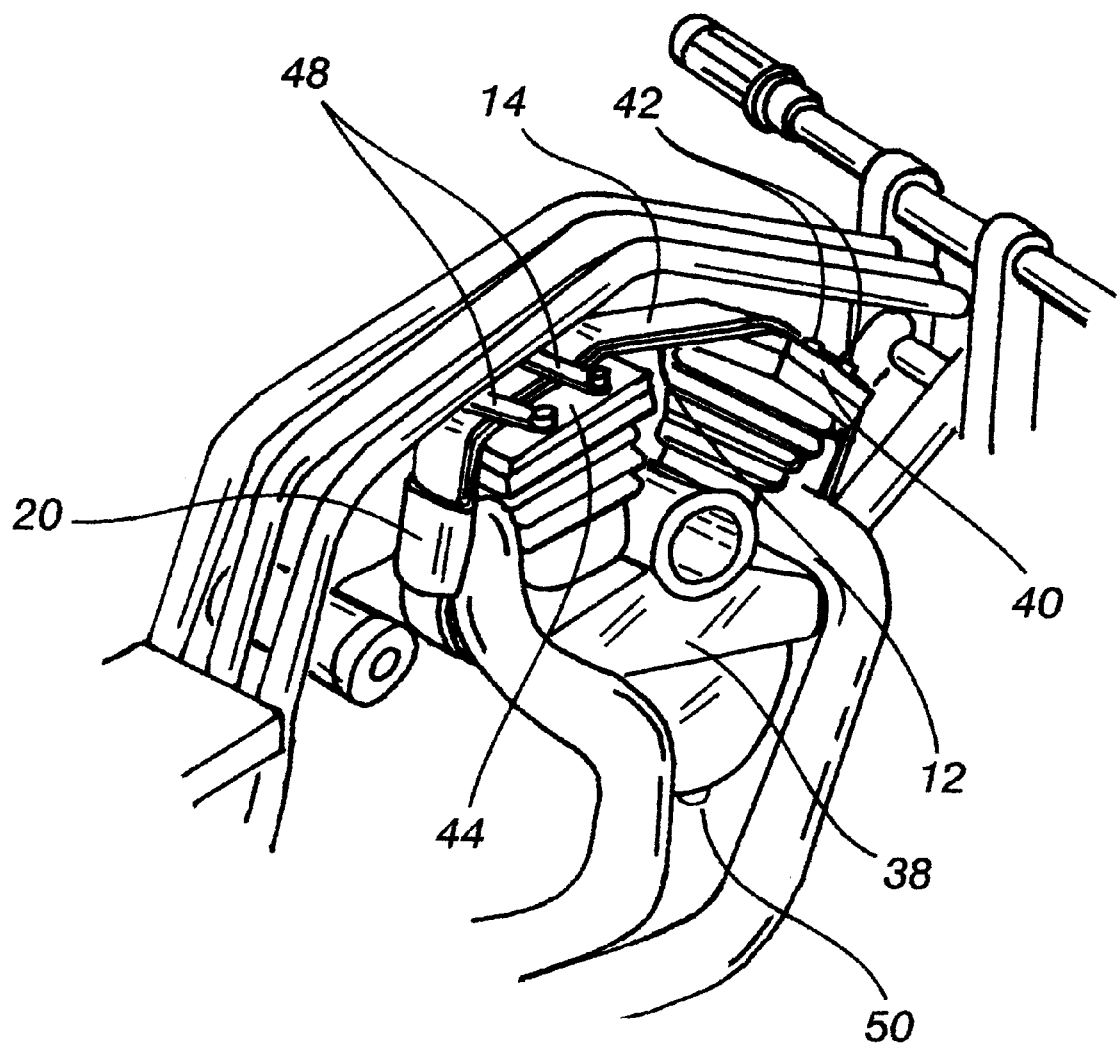
FIG. 3 is a side detailed view of the containment strap installed around the piston heads of a motor engine.

Referring now to the drawings, and particularly to FIGS. 1–4, the invented motor engine containment strap 10 (FIG. 4) includes two aligned layers of material and two metal buckles. Each layer of material is heavily woven Kevlar™, having interwoven web construction. The dual layers, when aligned and placed around a motor engine 38 (FIG. 3), form a first webbed layer 12 and a second, or outer, webbed layer 14. As shown in FIGS. 2–4, the layers 12, 14 are aligned, looped around a motor engine, and pulled end to end. Each end of the strap 10 is attached to a metal buckle. The strap 10 is secured around the motor engine by overlapping the metal buckles and bolting the buckles together.

The first webbed layer 12 and the second webbed layer 14, when placed together as to form a singular, multi-layer strap, have respective first ends 16, 18 and respective second ends 16', 18' (FIG. 4).

As shown in FIG. 4, layers 12 and 14 are connected to first buckle 22 by inserting the first ends of the layers 16, 18 through first buckle slot 24, and then overlapping the first ends of the layers 16, 18 back upon the layers 12, 14 and affixing the ends 16, 18 thereto. The overlap formed by the layer ends 16, 18 upon layers 12, 14 should be at least 3 inches, in order to provide enough stitchable area to properly affix the layer ends 16, 18 to the layers 12, 14. The overlapped webbed straps 12, 14 are double stitched 36 in a box and X pattern or similar reinforced pattern. The double stitching provides additional strength to the overlapped attachment of the ends of webbed layers 12, 14 through buckle 22. The stitching patterns meet or exceed ASTM standards for connecting straps together.

The second ends of the layers 16', 18' are attached to the second buckle 28, through second buckle slot 30 in the exact same manner as the first ends 16, 18 are attached to buckle 22.

The double overlap of the layer ends 16, 16', 18, 18' upon the double layers 12, 14 provides approximately 25% additional strength for fastening the dual web layers 12, 14 to the first buckle 22 and second buckle 28.

Other than the layer ends 16, 16', 18, 18' being stitched to layers 12, 14, the layers 12, 14 are not necessarily affixed to one another.

Each layer 12, 14 in the strap 10 is three inches to four inches wide, preferably four inches. The wider layers provide greater strength and therefore greater protection from projectile parts caused by an engine explosion. Each layer 12, 14 is composed of Kevlar™ reinforced webbing. Kevlar™ is currently the highest strength, industrially available material, however, similar high strength polymers or other materials can be used in this invention.

The containment strap 10 may have, but does not normally require, a Nomex™ or similar heat resistant covering (not shown) to protect the dual webbed layers 12, 14 from high temperatures when attached to, or in contact with, the engine 38 or the piston heads 40, 44. The Kevlar™ used in the preferred embodiment, having no protective coating, can withstand temperatures up to 950° F. without loss of structural integrity.

A perforated aluminum heat guard 20 is folded around strap 10 at a position on the strap where the strap contacts the exhaust of the motorcycle engine. The heat guard 20 is held in place by folding the heat guard material around the layers 12, 14, and need not be otherwise affixed to the layers 12, 14. The guard 20 protects the layers 12, 14 from the extreme heat of the exhaust of the engine.

The first and second buckles 22, 28 are substantially square and flat metal plates. Preferably, the buckles are manufactured from ¼" thick steel plate material. Each of the buckles 22 and 28 defines a slot, respectively 24 and 30, near an edge of the buckle, and each of the buckles defines two bolt holes, respectively 26, 27, 26', 27', along a second opposing edge of the buckle.

The containment strap 10 is attached to an engine by looping the strap over the top of, and under the bottom of, an engine as shown in FIG. 3. The portion of the strap 10 which passes over the top of the engine rests upon the cylinder heads of the engine. When used for a motorcycle engine, there will most likely be two cylinder heads, one in front of the other. The strap 10 is held in place laterally upon the cylinder heads by cylinder head attachment bars 42 and 48. There will typically be two cylinder head attachment bars 42 and 48 attached to each cylinder head. The cylinder head attachment bars 42, 48 may be attached directly to the cylinder heads of a motor by drill taping the cylinder heads and bolting the attachment bars 42, 48 to the cylinder heads. A lower engine block attachment bar 50 is utilized to maintain the strap in place underneath the engine block.

The strap 10 is placed around the motor in such a way as to align the heat guard 20 with the exhaust, such that the layers of material 12, 14 are protected from the extreme heat of the motor exhaust.

The strap 10 is placed around the motor in such a way that the buckles 22, 28 come together either slightly in front of the front cylinder head or slightly behind the rear cylinder head. This allows easy access to the buckles 22, 28. A pinch bar or similar device is used to pull hole 26 into alignment with hole 26' and to pull hole 27 into alignment with hole 27'. The aligned holes are then fixed in position using bolts 33 and 35 and nuts 32 and 34. It has been found that the strap 10 displays better resistance to extreme pressure, such as that of an engine explosion, when the strap 10 is fit tightly around the motor. Therefore the strap 10 is manufactured to be just long enough to fit around the model of motor for which it is designed.

Although the strap could be constructed with an adjustable mechanism such that the strap can be shortened or lengthened for use with a variety of engines, the preferred embodiment avoids the use of such mechanism.

Though specifically designed for high-performance motorcycle engines, the containment strap 10 may be installed around high performance motorcycle, boat, or airplane engine blocks.

TEST RESULTS

Results of strength tests performed with various strap configurations are shown below. Strap identification numbers are followed by the number layers in the strap configuration; width of the layers; material from which the layers are woven; required strength, expressed as pounds of force, as determined by the Safety Foundation Institute located in California; and finally, the strength of each belt configuration as tested.

| Strap | Number of Layers | Width of Layers (inches) | Material | Force Required (S.F.I.) | Force, as tested |
|---|---|---|---|---|---|
| E.C.S.- 14 | 1 | 4 | 2863-4 Natural "R" Kevlar ™ | 28,500 lbs. | 35,000+ lbs. |
| E.C.S.- 23 | 2 | 3 | Natural Kevlar ™ Patt-6126 Lt. "R" | 28,500 lbs. | 40,000+ lbs. |
| E.C.S.- 24 | 2 | 4 | 2864-4 | 28,500 lbs. | 40,000+ |

-continued

| Strap | Number of Layers | Width of Layers (inches) | Material | Force Required (S.F.I.) | Force, as tested |
|---|---|---|---|---|---|
| | | | Natural "R" Kevlar™ | | lbs. |

ALTERNATIVE EMBODIMENTS

The containment strap may be fitted to encircle any cylinder arrangement for a motorcycle engine such as V-twin cylinders, opposed twin cylinders, angled v-twin cylinders, and/or four or six cylinder motorcycle engines.

The Kevlar™ reinforced web strapping may be combined with a plurality of containment straps to form a containment blanket for high performance boat race engines, automobile dragster engines, or high performance airplane engines.

SUMMARY OF THE ACHIEVEMENT OF THE OBJECTS OF THE INVENTION

From the foregoing, it is readily apparent that I have invented an improved apparatus for encircling a high performance motor engine that includes a strong and pliable containment strap that can withstand a highly destructive separation of engine parts from high performance motor engines to protect the race driver from bodily harm.

It is to be understood that the foregoing description and specific embodiments are merely illustrative of the best mode of the invention and the principles thereof, and that various modifications and additions may be made to the apparatus and method of operation by those skilled in the art, without departing from the scope of this invention.

What is claimed is:

1. An engine containment strap for containing cylinder heads and other parts of a high-performance motor engine during an uncontrolled explosion of the engine, and for protecting the operator of the motor engine from parts projected from the motor engine as a result of the uncontrolled explosion, comprising:
    at least one layer of heavily woven material having interwoven web construction;
    said layer of material forming a substantially flat elongate belt, having a first end, and a second end, said second end opposing the first; and,
    a first and a second buckle, wherein said first buckle has a slot and at least two holes passing through said first buckle, and said second buckle has a slot and at least two holes passing through said second buckle;
    said first end of said at least one layer passing through said slot of said first buckle and folded back upon itself forming a first overlapped region of the strap;
    said second end of said at least one layer passing through said slot of said second buckle and folded back upon itself forming a second overlapped region of the strap;
    said first and said second overlapped regions sewn with reinforced stitching such that said first end of said at least one layer is fixedly attached to said first buckle, and such that said second end of said at least one layer is fixedly attached to said second buckle.

2. An engine containment strap as in claim 1, wherein said buckles are formed from ¼" steel plate material.

3. An engine containment strap as in claim 1, wherein the at least one layer is woven from Kevlar™.

4. An engine containment strap for containing cylinder heads and other parts of a high-performance motor engine during an uncontrolled explosion of the engine, and for protecting the operator of the motor engine from parts projected from the motor engine as a result of the uncontrolled explosion, comprising:
    at least one layer of heavily woven material having interwoven web construction;
    a heat resistant covering surrounding said at least one layer, said covering being resistant to heat of at least 950° F.;
    said layer of material forming a substantially flat elongate belt, having a first end, and a second end, said second end opposing the first; and,
    a first and a second buckle, each having a slot and at least one hole passing through said buckles;
    said first end of said at least one layer passing through said slot of said first buckle and folded back upon itself forming a first overlapped region of the strap;
    said second end of said at least one layer passing through said slot of said second buckle and folded back upon itself forming a second overlapped region of the strap;
    said first and said second overlapped regions sewn with reinforced stitching such that said first end of said at least one layer is fixedly attached to said first buckle, and such that said second end of said at least one layer is fixedly attached to said second buckle.

5. An engine containment strap as in claim 4, wherein said covering is Nomex™.

6. An engine containment strap as in claim 4, further comprising a perforated aluminum heat guard folded around said at least one layer.

7. An engine containment strap as in claim 4 wherein the at least one layer is woven from Kevlar™.

8. An engine containment strap for containing cylinder heads and other parts of a high-performance motor engine during an uncontrolled explosion of the engine, and for protecting the operator of the motor engine from parts projected from the motor engine as a result of the uncontrolled explosion, comprising:
    at least two layers of heavily woven material having interwoven web construction;
    said layers of material forming a substantially flat elongate belt, having a first end, and a second end, said second end opposing the first; and,
    a first and a second buckle, each having a slot and at least one hole passing through said buckles;
    said first end of said at least two layers passing through said slot of said first buckle and folded back upon itself forming a first overlapped region of the strap;
    said second end of said at least two layers passing through said slot of said second buckle and folded back upon itself forming a second overlapped region of the strap;
    said first and said second overlapped regions sewn with reinforced stitching such that said first end of said at least two layers is fixedly attached to said first buckle, and such that said second end of said at least two layers is fixedly attached to said second buckle.

9. An engine containment strap as in claim 8, wherein the layers are about 3 inches wide.

10. An engine containment strap as in claim 8, wherein the layers are about 4 inches wide.

11. An engine containment strap as in claim 8, wherein said strap is capable of withstanding 40,000 pounds of force.

12. An engine containment strap as in claim 8, wherein at least two layers are woven from Kevlar™.

13. A method of attaching an engine containment strap having buckles to a motor engine, comprising the steps of:

looping the strap over the top of and under the bottom of the motor engine, such that the loop passes over the cylinder heads of the motor engine;

drill tapping the cylinder heads of the motor engine;

affixing the strap laterally upon the cylinder heads with attachment bars, said attachment bars being bolted directly into the drill tapped cylinder heads;

using a pinch bar or similar device to pull the ends of the strap together, such that connection holes in the strap buckles align with one another; and, bolting said aligned strap buckles together.

14. A method of attaching an engine containment strap having buckles to a motor engine as in claim 13, further comprising:

drill tapping the bottom portion of the motor engine; and, affixing the strap laterally upon the bottom of the motor engine with an attachment bar, said attachment bar being bolted directly into the drill tapped motor engine.

15. A method of attaching an engine containment strap having buckles to a motor engine as in claim 14, further comprising:

folding a heat shield around the strap such that the heat shield rests between the strap and the exhaust manifold of the motor engine.

\* \* \* \* \*